(12) United States Patent
Zhou et al.

(10) Patent No.: US 11,260,759 B2
(45) Date of Patent: Mar. 1, 2022

(54) ELECTRIC VEHICLE AND METHOD FOR CHARGING BETWEEN ELECTRIC VEHICLES

(71) Applicant: Huawei Technologies Co., Ltd., Shenzhen (CN)

(72) Inventors: Kui Zhou, Dongguan (CN); Wentao He, Shenzhen (CN); Xiaokang Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 16/366,633

(22) Filed: Mar. 27, 2019

(65) Prior Publication Data

US 2019/0217732 A1    Jul. 18, 2019

Related U.S. Application Data

(63) Continuation of application No. PCT/CN2017/103559, filed on Sep. 27, 2017.

(30) Foreign Application Priority Data

Sep. 27, 2016   (CN) .......................... 201610852719.7

(51) Int. Cl.
*B60L 50/60*       (2019.01)
*B60L 53/14*       (2019.01)
(Continued)

(52) U.S. Cl.
CPC .............. *B60L 50/60* (2019.02); *B60L 53/14* (2019.02); *B60L 53/16* (2019.02); *B60L 53/18* (2019.02);
(Continued)

(58) Field of Classification Search
CPC .......... H02J 7/342; H02J 7/00; H02J 2207/40; H01M 10/42; B60L 50/60; B60L 53/62;
(Continued)

(56) References Cited

U.S. PATENT DOCUMENTS

| | | | |
|---|---|---|---|
| 2012/0299531 A1* | 11/2012 | Prosser .................. | B60L 53/57 320/104 |
| 2013/0020993 A1* | 1/2013 | Taddeo .................. | B60L 53/16 320/109 |

(Continued)

FOREIGN PATENT DOCUMENTS

| CN | 102161318 A | 8/2011 |
|---|---|---|
| CN | 103187759 A | 7/2013 |

(Continued)

OTHER PUBLICATIONS

Machine Translation and Abstract of Chinese Publication No. CN103187759, Jul. 3, 2013, 40 pages.
(Continued)

*Primary Examiner* — Nathaniel R Pelton
(74) *Attorney, Agent, or Firm* — Conley Rose, P.C.

(57) ABSTRACT

An electric vehicle that includes a battery pack, a direct current socket, and a controller and a charging method for charging between electric vehicles, where in a process in which the direct current socket is coupled to an alternating current socket of another electric vehicle using a charge/discharge cable, the battery pack is controlled based on a charging request of the other electric vehicle to charge the other electric vehicle. Hence, charging between electric vehicles can be conveniently implemented.

20 Claims, 10 Drawing Sheets

(51) Int. Cl.
   *H02J 7/00* (2006.01)
   *H01M 10/42* (2006.01)
   *B60L 53/30* (2019.01)
   *H02J 7/34* (2006.01)
   *B60L 53/62* (2019.01)
   *B60L 53/66* (2019.01)
   *B60L 53/16* (2019.01)
   *B60L 53/18* (2019.01)
   *B60L 53/20* (2019.01)

(52) U.S. Cl.
   CPC .............. *B60L 53/30* (2019.02); *B60L 53/62* (2019.02); *B60L 53/66* (2019.02); *H01M 10/42* (2013.01); *H02J 7/00* (2013.01); *H02J 7/342* (2020.01); *B60L 53/20* (2019.02); *B60L 2210/10* (2013.01); *B60Y 2200/91* (2013.01); *B60Y 2300/91* (2013.01); *H02J 2207/40* (2020.01); *Y02T 10/70* (2013.01)

(58) Field of Classification Search
   CPC .......... B60L 53/14; B60L 53/66; B60L 53/16; B60L 53/18; B60L 53/30; B60L 53/20
   USPC .................................................. 320/104, 109
   See application file for complete search history.

(56) References Cited

U.S. PATENT DOCUMENTS

| | | | | |
|---|---|---|---|---|
| 2014/0091764 | A1* | 4/2014 | Kinomura | B60L 53/16 320/109 |
| 2014/0184141 | A1* | 7/2014 | Loftus | B60L 3/00 320/104 |
| 2014/0229050 | A1 | 8/2014 | Ishibashi | |
| 2015/0175022 | A1 | 6/2015 | Storm et al. | |
| 2016/0023562 | A1* | 1/2016 | Parra Ortiz | B60L 53/60 320/109 |
| 2017/0253134 | A1* | 9/2017 | Berger | B60L 53/14 |
| 2017/0368953 | A1* | 12/2017 | Zech | B60L 53/60 |

FOREIGN PATENT DOCUMENTS

| | | |
|---|---|---|
| CN | 105835714 A | 8/2016 |
| DE | 102013114945 A1 | 7/2014 |
| WO | 2014174808 A1 | 10/2014 |

OTHER PUBLICATIONS

Machine Translation and Abstract of Chinese Publication No. CN105835714, Aug. 10, 2016, 12 pages.
Foreign Communication From A Counterpart Application, PCT Application No. PCT/CN2017/103559, English Translation of International Search Report dated Jan. 9, 2018, 3 pages.
Foreign Communication From A Counterpart Application, PCT Application No. PCT/CN2017/103559, English Translation of Written Opinion dated Jan. 9, 2018, 4 pages.
GB/T 27930-2011, "Communication Protocols between Off-board Conductive Charger and Battery Management System for Electric Vehicle," Mar. 1, 2012, 35 pages.
Machine Translation and Abstract of International Publication No. WO2014174808, Oct. 30, 2014, 31 pages.
"IEEE Standard Technical Specifications of a DC Quick Charger for Use with Electric Vehicles," XP068106322, IEEE Std 2030.1.1-2015, Piscataway, NJ, USA, Feb. 5, 2016, 97 pages.
Foreign Communication From A Counterpart Application, European Application No. 17854866.5, Partial Supplementary European Search Report dated Aug. 30, 2019, 9 pages.

* cited by examiner

ELECTRIC VEHICLE AND METHOD FOR CHARGING BETWEEN ELECTRIC VEHICLES

CROSS-REFERENCE TO RELATED APPLICATIONS

This application is a continuation of International Patent Application No. PCT/CN2017/103559 filed on Sep. 27, 2017, which claims priority to Chinese Patent Application No. 201610852719.7 filed on Sep. 27, 2016. The disclosures of the aforementioned applications are hereby incorporated by reference in their entireties.

TECHNICAL FIELD

This application relates to the field of electric vehicles, and in particular, to an electric vehicle and a method for charging between electric vehicles.

BACKGROUND

An electric vehicle is usually supplemented with energy using an alternating current/direct current charging pile. However, charging of the electric vehicle is not convenient due to a limited quantity and uneven distribution of charging piles. Mutual charging between vehicles is a better choice when remaining electricity power of an electric vehicle cannot support the electric vehicle in travelling to a next charging pile.

In other approaches solution, an in-vehicle charger in an electric vehicle is changed such that the in-vehicle charger has a bidirectional conversion function (not only an alternating current can be converted into a direct current, but also a direct current can be converted into an alternating current). During charging, an alternating current socket of a charged vehicle is connected to an alternating current socket of a discharged vehicle using a charge/discharge cable. During charging, a high-voltage battery pack of the discharged vehicle outputs a high-voltage direct current. The high-voltage direct current is converted into an alternating current using an in-vehicle charger, the alternating current enters the alternating current socket of the charged vehicle through the alternating current socket and the charge/discharge cable, and finally the alternating current is converted into a high-voltage direct current using an in-vehicle charger of the charged vehicle to charge a high-voltage battery pack of the charged vehicle.

In this solution, the in-vehicle charger needs to be changed to support the bidirectional conversion function. In this way, costs, a volume, and the like of the in-vehicle charger are inevitably increased, and conversion efficiency of the in-vehicle charger is reduced.

SUMMARY

This application provides an electric vehicle and a method for charging between electric vehicles, to better implement charging between electric vehicles.

According to a first aspect, an electric vehicle is provided, and includes a battery pack, a direct current socket, and a controller. When the direct current socket is connected to an alternating current socket of another electric vehicle using a charge/discharge cable, the controller controls, based on a charging request of the other electric vehicle, the battery pack to charge the other electric vehicle.

The controller may be integrated into a power management module of the electric vehicle or into a module that has a control function in the electric vehicle.

When the direct current socket of the electric vehicle is connected to the alternating current socket of the other electric vehicle using the charge/discharge cable, if the controller receives the charging request of the other electric vehicle, the controller may control, based on the charging request, the battery pack of the electric vehicle to charge the other electric vehicle. Compared with other approaches design solution in which a charger of the electric vehicle needs to be changed, a design solution in which the charger of the electric vehicle is not changed allows using the battery pack of the electric vehicle to charge the other electric vehicle such that charging between the electric vehicles can be conveniently implemented.

With reference to the first aspect, in a implementation of the first aspect, before the controller controls, based on the charging request of the other electric vehicle, the battery pack to charge the other electric vehicle, the controller is further configured to send a discharging configuration parameter to the other electric vehicle.

The discharging configuration parameter is sent to the other electric vehicle such that the other electric vehicle can convert, based on the discharging configuration parameter, a direct current that is output by the electric vehicle into a direct current that matches a battery pack of the other electric vehicle, to charge the other electric vehicle.

With reference to the first aspect, in a implementation of the first aspect, the discharging configuration parameter includes at least one of electric energy, a discharging voltage, a discharging current, and discharging power that can be supplied by the battery pack when the battery pack charges the other electric vehicle.

With reference to the first aspect, in a implementation of the first aspect, before the controller controls, based on the charging request of the other electric vehicle, the battery pack to charge the other electric vehicle, the controller is further configured to receive a handshake request message sent by the other electric vehicle, send a handshake response message to the other electric vehicle, to establish a communication connection between the electric vehicle and the other electric vehicle, and obtain the charging request based on the communication connection.

Charging safety and reliability can be improved by establishing the communication connection.

With reference to the first aspect, in a implementation of the first aspect, the controller is further configured to control the battery pack to stop charging the other electric vehicle when an abnormality occurs in charging.

When the abnormality occurs, the battery pack can be controlled to stop outputting a direct current to stop charging the other electric vehicle, thereby improving charging safety.

With reference to the first aspect, in a implementation of the first aspect, the charge/discharge cable includes a discharging plug, a charging plug, and a cable connecting the charging plug and the discharging plug, the discharging plug matches the direct current socket, and the charging plug matches the alternating current socket of the other electric vehicle.

The discharging plug and the charging plug respectively match the direct current socket and the alternating current socket such that the discharging plug can obtain a direct current from the direct current socket of the discharged vehicle and input the direct current into the charging plug through the cable, and then the charging plug inputs the direct current into the alternating current socket of the charged vehicle, to charge the charged vehicle.

With reference to the first aspect, in a implementation of the first aspect, any one of a pin L1, a pin L2, and a pin L3 of the charging plug is connected to a first pin of the discharging plug using the cable, and a pin N of the charging plug is connected to a second pin of the discharging plug using the cable, where the first pin and the second pin are respectively a pin DC+ and a pin DC−, or the first pin and the second pin are respectively a pin DC− and a pin DC+.

For example, the pin L1 of the charging plug is connected to the pin DC− of the discharging plug using the cable, and the pin N of the charging plug is connected to the pin DC+ of the discharging plug using the cable.

In some implementations, the electric vehicle further includes the charge/discharge cable. That is, the charge/discharge cable is also an integral part of the electric vehicle.

In some implementations, the charging request includes a charging requirement parameter, and the charging requirement parameter includes at least one of electric energy, a charging voltage, a charging current, and charging power that are required by the other electric vehicle during charging.

In some implementations, the controller determines the electric vehicle as a discharged vehicle before the controller controls the battery pack to charge the other electric vehicle.

In some implementations, that the controller determines the electric vehicle as a discharged vehicle includes that when the direct current socket is connected to the discharging plug of the charge/discharge cable, the controller determines the electric vehicle as the discharged vehicle.

In some implementations, before the controller controls the battery pack to charge the other electric vehicle, the controller is further configured to receive a charging preparation command sent by the other electric vehicle, where the charging preparation command is used to instruct the electric vehicle to charge the other electric vehicle.

In some implementations, before the controller controls the battery pack to charge the other electric vehicle, the controller is further configured to send a discharging preparation command to the other electric vehicle. The discharging preparation command is used to instruct the other electric vehicle to prepare to receive a direct current that is output by the electric vehicle.

According to a second aspect, an electric vehicle is provided, and includes a battery pack, an alternating current socket, and a charger. In a process in which the alternating current socket is connected to a direct current socket of another electric vehicle using a charge/discharge cable, the charger receives a direct current that is output by the other electric vehicle to charge the battery pack.

When the alternating current socket of the electric vehicle is connected to the direct current socket of the other electric vehicle using the charge/discharge cable, the direct current that is output by the other electric vehicle may be used to charge the battery pack of the electric vehicle. Compared with a other approaches design solution in which the charger of the electric vehicle needs to be changed, a design solution in which the charger of the electric vehicle is not changed allows using the direct current, output by the other electric vehicle, to charge the battery pack of the electric vehicle such that charging between the electric vehicles can be conveniently implemented.

With reference to the second aspect, in a implementation of the second aspect, the electric vehicle further includes a controller configured to obtain a discharging configuration parameter of the other electric vehicle, where the charger is further configured to convert, based on the discharging configuration parameter, the direct current that is output by the other electric vehicle into a direct current that matches the battery pack, to charge the battery pack.

The controller sends a charging request to the other electric vehicle to obtain the discharging configuration parameter of the other electric vehicle such that the charger can convert, based on the discharging configuration parameter of the other electric vehicle, the direct current that is output by the other electric vehicle into the direct current that matches the battery pack of the electric vehicle, to charge the battery pack of the electric vehicle.

With reference to the second aspect, in a implementation of the second aspect, the controller is further configured to send a charging request to the other electric vehicle, and receive the discharging configuration parameter sent by the other electric vehicle after the other electric vehicle receives the charging request.

With reference to the second implementation of the second aspect, in a implementation of the second aspect, the discharging configuration parameter includes at least one of electric energy, a discharging voltage, a discharging current, and discharging power that can be supplied by the other electric vehicle when the other electric vehicle charges the battery pack.

With reference to the second aspect, in a implementation of the second aspect, before the charger charges the battery pack, the controller is further configured to send a handshake request message to the other electric vehicle, and receive a handshake response message of the other electric vehicle, to establish a communication connection between the electric vehicle and the other electric vehicle.

The controller can obtain the discharging configuration parameter of the other electric vehicle based on the communication connection. In addition, charging safety and reliability can be improved by establishing the communication connection before charging.

With reference to the fourth implementations of the second aspect, in a implementation of the second aspect, the controller is further configured to control the charger to stop charging the battery pack when an abnormality occurs in charging.

When the abnormality occurs, the battery pack can be controlled to stop outputting a direct current to stop charging the other electric vehicle, thereby improving charging safety.

With reference to the second aspect, in a implementation of the second aspect, the charge/discharge cable includes a discharging plug, a charging plug, and a cable connecting the charging plug and the discharging plug, the charging plug matches the alternating current socket, and the discharging plug matches the direct current socket of the other electric vehicle.

The discharging plug and the charging plug respectively match the direct current socket and the alternating current socket such that the discharging plug can obtain a direct current from the direct current socket of the discharged vehicle and input the direct current into the charging plug through the cable, and then the charging plug inputs the direct current into the alternating current socket of the charged vehicle, to charge the charged vehicle.

With reference to the second aspect, in a implementation of the second aspect, any one of a pin L1, a pin L2, and a pin L3 of the charging plug is connected to a first pin of the discharging plug using the cable, and a pin N of the charging plug is connected to a second pin of the discharging plug using the cable, where the first pin and the second pin are respectively a pin DC+ and a pin DC−, or the first pin and the second pin are respectively a pin DC− and a pin DC+.

For example, the pin L1 of the charging plug is connected to the pin DC+ of the discharging plug using the cable, and the pin N of the charging plug is connected to the pin DC− of the discharging plug using the cable.

In some implementations, the electric vehicle further includes the charge/discharge cable. That is, the charge/discharge cable is also an integral part of the electric vehicle.

In some implementations, the charging request includes a charging requirement parameter, and the charging requirement parameter includes at least one of electric energy, a charging voltage, a charging current, and charging power that are required by the electric vehicle during charging.

In some implementations, before the charger receives the direct current that is output by the other electric vehicle, to charge the battery pack, the controller determines the electric vehicle as the discharged vehicle.

In some implementations, that the controller determines the electric vehicle as a discharged vehicle includes that when the alternating current socket is connected to the charging plug of the charge/discharge cable, the controller determines the electric vehicle as the charged vehicle.

In some implementations, before the charger receives the direct current that is output by the other electric vehicle, to charge the battery pack, the controller is further configured to send a charging preparation command to the other electric vehicle, where the charging preparation command is used to instruct the other electric vehicle to charge the electric vehicle.

In some implementations, before the charger receives the direct current that is output by the other electric vehicle, to charge the battery pack, the controller is further configured to receive a discharging preparation command sent by the other electric vehicle. The discharging preparation command is used to instruct the electric vehicle to prepare to receive the direct current that is output by the other electric vehicle.

According to a third aspect, a method for charging between electric vehicles is provided. The method is applied to a discharged first electric vehicle, and the first electric vehicle includes a battery pack, a direct current socket, and a controller. The method includes determining, by the controller, that the direct current socket is connected to an alternating current socket of a second electric vehicle using a charge/discharge cable, and controlling, by the controller, the battery pack to charge the second electric vehicle.

When the direct current socket of the first electric vehicle is connected to the alternating current socket of the second electric vehicle using the charge/discharge cable, the controller may control the battery pack of the first electric vehicle to charge the second electric vehicle. Compared with a other approaches design solution in which a charger of the electric vehicle needs to be changed, a design solution in which the charger of the electric vehicle is not changed allows using the battery pack of the first electric vehicle to charge the second electric vehicle such that charging between the electric vehicles can be conveniently implemented.

With reference to the third aspect, in a implementation of the third aspect, before controlling, by the controller, the battery pack to charge the second electric vehicle, the method further includes receiving, by the controller, a charging request of the second electric vehicle, and after receiving the charging request, sending, by the controller, a discharging configuration parameter to the second electric vehicle.

The discharging configuration parameter is sent to the second electric vehicle such that the second electric vehicle can convert, based on the discharging configuration parameter, a direct current that is output by the first electric vehicle into a direct current that matches a battery pack of the second electric vehicle to charge the second electric vehicle.

With reference to the third aspect, in a implementation of the third aspect, the discharging configuration parameter includes at least one of electric energy, a discharging voltage, a discharging current, and discharging power that can be supplied by the battery pack when the battery pack charges the second electric vehicle.

With reference to the third aspect, in a implementation of the third aspect, before controlling, by the controller, the battery pack to charge the second electric vehicle, the method further includes receiving, by the controller, a handshake request message sent by the second electric vehicle, and sending, by the controller, a handshake response message to the second electric vehicle, to establish a communication connection between the first electric vehicle and the second electric vehicle.

Charging safety and reliability can be improved by establishing the communication connection.

With reference to the third aspect, in a implementation of the third aspect, the method further includes when an abnormality occurs in charging, controlling the battery pack to stop charging the second electric vehicle.

When the abnormality occurs, the battery pack can be controlled to stop outputting a direct current to stop charging the other electric vehicle, thereby improving charging safety.

According to a fourth aspect, a method for charging between electric vehicles is provided. The method is applied to a charged second electric vehicle, and the second electric vehicle includes a battery pack, an alternating current socket, a charger, and a controller. The method includes determining, by the controller, that the alternating current socket is connected to a direct current socket of a first electric vehicle using a charge/discharge cable, and controlling, by the controller, the charger to receive a direct current that is output by the first electric vehicle to charge the battery pack.

With reference to the fourth aspect, in a implementation of the fourth aspect, the method further includes obtaining, by the controller, a discharging configuration parameter of the first electric vehicle, and converting, by the charger based on the discharging configuration parameter, the direct current that is output by the first electric vehicle into a direct current that matches the battery pack to charge the battery pack.

When the alternating current socket of the second electric vehicle is connected to the direct current socket of the first electric vehicle using the charge/discharge cable, the direct current that is output by the first electric vehicle may be used to charge the battery pack of the second electric vehicle. Compared with a other approaches design solution in which the charger of the electric vehicle needs to be changed, a design solution in which the charger of the electric vehicle is not changed allows using the direct current, output by the first electric vehicle to charge the battery pack of the second electric vehicle such that charging between the electric vehicles can be conveniently implemented.

With reference to the fourth aspect, in a implementation of the fourth aspect, obtaining, by the controller, a discharging configuration parameter of the first electric vehicle includes sending, by the controller, a charging request to the first electric vehicle, and receiving, by the controller, the discharging configuration parameter sent by the first electric vehicle after the first electric vehicle receives the charging request.

The charging request is sent to the first electric vehicle to obtain the discharging configuration parameter of the first electric vehicle such that the controller can convert, based on the discharging configuration parameter, the direct current that is output by the first electric vehicle into the direct current that matches the battery pack of the second electric vehicle, to charge the second electric vehicle.

With reference to the fourth aspect, in a implementation of the fourth aspect, the discharging configuration parameter includes at least one of electric energy, a discharging voltage, a discharging current, and discharging power that can be supplied by the first electric vehicle when the first electric vehicle charges the battery pack.

With reference to the fourth aspect, in a implementation of the fourth aspect, before the charger charges the battery pack, the method further includes sending, by the controller, a handshake request message to the first electric vehicle, and receiving, by the controller, a handshake response message of the first electric vehicle to establish a communication connection between the first electric vehicle and the second electric vehicle.

Charging safety and reliability can be improved by establishing the communication connection before charging.

With reference to the fourth aspect, in a implementation of the fourth aspect, the method further includes, when an abnormality occurs in charging, controlling, by the controller, the charger to stop charging the battery pack.

When the abnormality occurs, the battery pack can be controlled to stop outputting a direct current to stop charging the other electric vehicle, thereby improving charging safety.

DESCRIPTION OF EMBODIMENTS

The following describes technical solutions of this application with reference to accompanying drawings.

Figure 1:
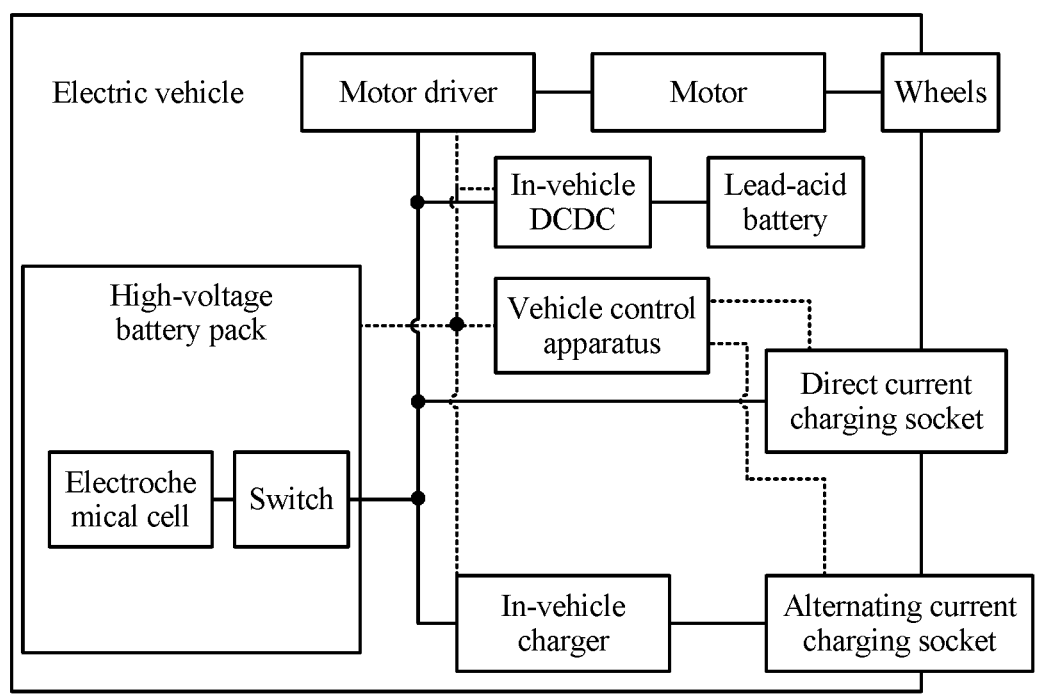
FIG. 1 is a schematic block diagram of an electric vehicle.

To better facilitate understanding of an electric vehicle in the embodiments of this application, the following first briefly describes a specific structure of the electric vehicle with reference to FIG. 1. The electric vehicle in FIG. 1 includes a high-voltage battery pack, a motor driver, a motor, wheels, an in-vehicle direct current to direct current (DCDC), a lead-acid battery, a vehicle control apparatus, a direct current charging socket, an alternating current charging socket, and an in-vehicle charger. The high-voltage battery pack includes an electrochemical cell and a switch.

The electric vehicle may be charged using the direct current charging socket and the alternating current charging socket. When the electric vehicle is charged using the alternating current charging socket, an alternating current charging pile is connected to the alternating current charging socket using a cable, and an alternating current from the alternating current charging pile is input through the alternating current socket.

The in-vehicle charger converts the input alternating current into a high-voltage direct current, and charges the high-voltage battery pack using the high-voltage direct current. When the electric vehicle is charged using the direct current charging socket, a direct current charging pile is connected to the direct current charging socket using a cable. A direct current from the direct current charging pile is input through the direct current socket to directly charge the high-voltage battery pack.

When the vehicle is travelling, the high-voltage battery pack outputs a high-voltage direct current to the motor driver, the motor driver converts the high-voltage direct current into an alternating current for use by the motor, and the motor drives the wheels to rotate.

In addition, the high-voltage battery pack may further charge the lead-acid battery. Further, the high-voltage battery pack outputs the high-voltage direct current to the in-vehicle DCDC, and the in-vehicle DCDC converts the high-voltage direct current into a low-voltage direct current to charge the lead-acid battery.

The foregoing processes may be completed by the vehicle control apparatus of the electric vehicle.

Figure 2:
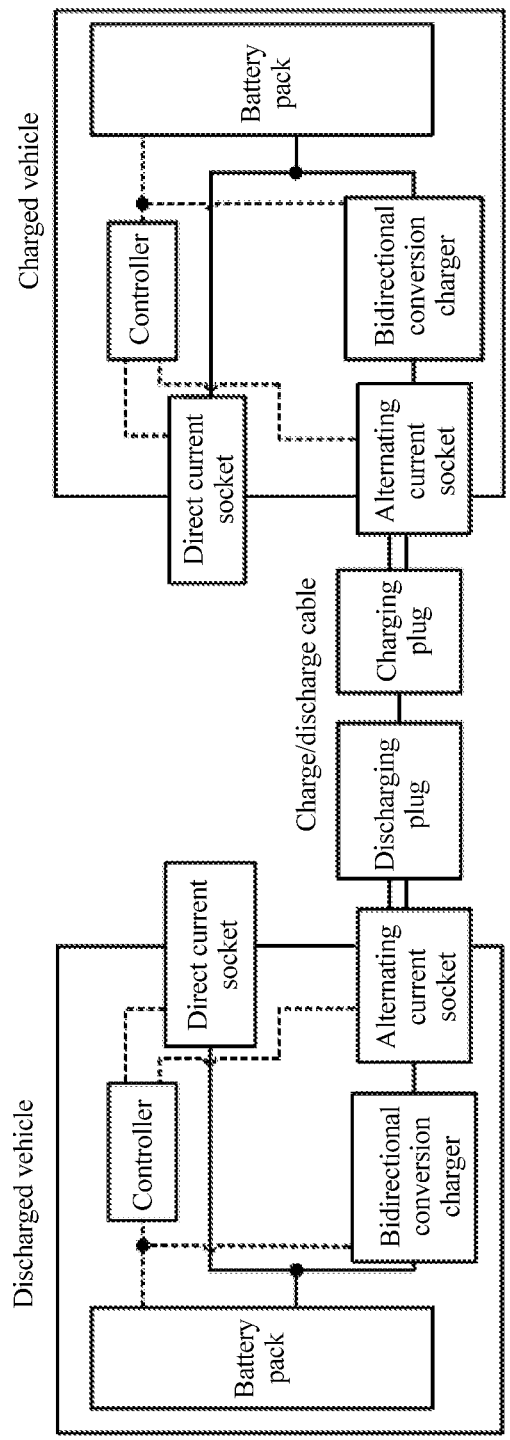
FIG. 2 is a schematic diagram of a connection during charging between electric vehicles.

To better understand an electric vehicle and a method for charging between electric vehicles in the embodiments of this application, the following first describes, in detail with reference to FIG. 2, how to perform charging between electric vehicles in the other approaches.

FIG. 2 is a schematic diagram of a connection during charging between electric vehicles in the other approaches. In FIG. 2, an alternating current socket of a discharged vehicle is connected to an alternating current socket of a charged vehicle using a charge/discharge cable. During charging, a bidirectional conversion charger of the discharged vehicle converts a direct current that is output by a battery pack into an alternating current, and outputs the alternating current to the alternating current socket of the charged vehicle using the charge/discharge cable. After receiving the alternating current, the alternating current socket of the charged vehicle converts the alternating current into a direct current that matches a battery pack of the charged vehicle, to charge the battery pack of the charged vehicle. In the foregoing process, the bidirectional conversion charger of the discharged vehicle needs to convert the direct current that is output by the battery pack into the alternating current, that is, the bidirectional conversion charger needs to perform an inverse process. Usually, a charger of an electric vehicle can convert only an alternating current received by an alternating current socket into a direct current that matches a battery pack, but cannot convert a direct current into an alternating current. An inverter circuit inevitably needs to be added to the charger such that the charger of the electric vehicle has a function of inverting the direct current into the alternating current. In this way, a volume and costs of the charger are increased, and conversion efficiency of the charger may be reduced. Therefore, the embodiments of this application provide an electric vehicle and a method for charging between electric vehicles. According to the electric vehicle and the method for charging between electric vehicles, mutual charging between electric vehicles can be implemented without changing structures of chargers of the electric vehicles. The following describes in detail the electric vehicle in the embodiments of this application with reference to FIG. 3 to FIG. 6.

Figure 3:
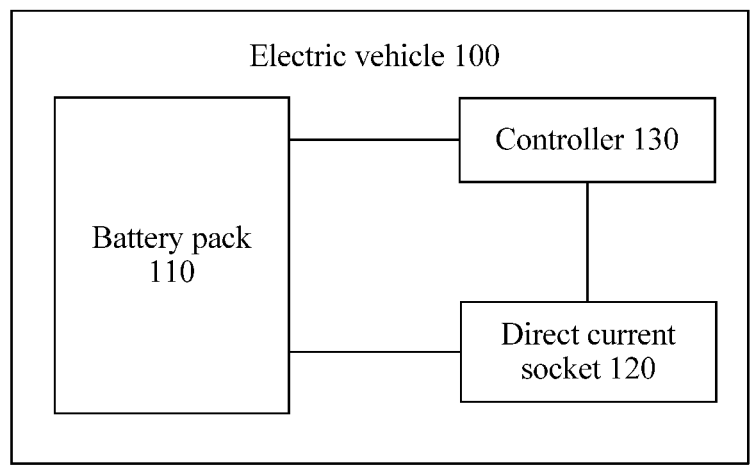
FIG. 3 is a schematic block diagram of an electric vehicle according to an embodiment of this application.

FIG. 3 is a schematic block diagram of an electric vehicle 100 according to an embodiment of this application. The electric vehicle 100 in FIG. 3 includes a battery pack 110, a direct current socket 120, and a controller 130, where when the direct current socket 120 of the electric vehicle 100 is connected to an alternating current socket of another electric vehicle using a charge/discharge cable, the controller 130 is configured to control, based on a charging request of the other electric vehicle, the battery pack 110 to charge the other electric vehicle.

The direct current socket 120 is a socket that can charge the battery pack 110 using a direct current charging pile. Further, when the direct current socket 120 is connected to the direct current charging pile using a charging cable, the battery pack 110 may be quickly charged using the direct current charging pile. In addition, the direct current socket 120 may further output a direct current outwards, to charge another battery pack.

It should be understood that the electric vehicle 100 is a discharged vehicle in a charging process, namely, a vehicle that supplies electric energy to the other electric vehicle in the charging process. In addition, the charge/discharge cable may be an integral part of the electric vehicle or a separate component independent of the electric vehicle.

It should be further understood that in the electric vehicle 100, the direct current socket 120 is connected to the battery pack 110, and the controller 130 is connected to the battery pack 110 and the direct current socket 120. The controller 130 may be a controller that has both a communication function and a control function. The controller 130 may not only communicate with the other electric vehicle, but also control another module of the electric vehicle 100. Further, the controller 130 may include a communications apparatus and a control apparatus of the electric vehicle 100, and the controller 130 has functions of the communications apparatus and the control apparatus.

In this embodiment of this application, when the direct current socket of the electric vehicle is connected to the alternating current socket of the other electric vehicle using the charge/discharge cable, the controller may control the battery pack of the electric vehicle to charge the other electric vehicle. Compared with other approaches design solution in which a charger of the electric vehicle needs to be changed, a design solution in which the charger of the electric vehicle is not changed allows using the battery pack of the electric vehicle to charge the other electric vehicle such that charging between the electric vehicles can be conveniently implemented.

Optionally, in an embodiment, the controller 130 determines the electric vehicle 100 as a discharged vehicle before the controller 130 controls the battery pack 110 to charge the other electric vehicle.

That the controller 130 determines the electric vehicle 100 as a discharged vehicle further includes that the controller 130 determines a status of a connection between the direct current socket 120 and the charge/discharge cable, and when the direct current socket 120 is connected to the charge/discharge cable, the controller 130 determines the electric vehicle 100 as the discharged vehicle.

Optionally, the controller 130 may further first determine that the direct current socket 120 is connected to a first plug of the charge/discharge cable, and then determine a resistance value of a resistor (for example, the resistor may be a resistor between a pin CC2 and a pin PE) in the first plug. When the resistance value of the resistor in the first plug is a preset resistance value, the controller 130 determines the electric vehicle 100 as the discharged vehicle.

Optionally, in an embodiment, before the controller 130 controls, based on the charging request of the other electric vehicle, the battery pack 110 to charge the other electric vehicle, the controller 130 is further configured to send a discharging configuration parameter to the other electric vehicle.

Further, the other electric vehicle sends the charging request to the controller 130 after the direct current socket 120 is connected to the alternating current socket of the other electric vehicle using the charge/discharge cable. The charging request is used to request the electric vehicle 100 to charge the other electric vehicle. The charging request may include a charging requirement parameter, and the charging requirement parameter may include at least one of electric energy, a charging voltage, a charging current, and charging power that are required by the other electric vehicle during charging. After obtaining the charging request of the other electric vehicle, the controller 130 needs to return, to the other electric vehicle, the discharging configuration parameter related when the electric vehicle 100 charges the other electric vehicle. Further, the discharging configuration parameter may include at least one of electric energy, a discharging voltage, a discharging current, and discharging power that can be supplied by the battery pack 110 when the battery pack 110 charges the other electric vehicle.

The discharging configuration parameter may be directly generated by the controller based on attribute information of the battery pack 110 after the controller receives the charging request. For example, if the battery pack 110 can only supply electric energy of a maximum of 50 kilowatt-hours to the other electric vehicle, the controller directly sends, to the other electric vehicle, information that the battery pack 110 can supply the electric energy of 50 kilowatt-hours.

In addition, the discharging configuration parameter may alternatively be comprehensively generated based on the charging requirement parameter in the charging request and attribute information of the battery pack 110. For example, if the charging requirement parameter indicates that the other electric vehicle needs electric energy of 30 kilowatt-hours, and the battery pack 110 can supply electric energy of 50 kilowatt-hours, the controller can send, to the other electric vehicle, a discharging configuration parameter that the battery pack 110 can supply the electric energy of 30 kilowatt-hours.

After receiving the discharging configuration parameter, a charger of the other electric vehicle may convert, based on the discharging configuration parameter, a direct current that is output by the battery pack 110 into a direct current that matches a battery pack of the other electric vehicle to charge the battery pack of the other electric vehicle.

Optionally, in an embodiment, before the controller 130 controls the battery pack 110 to charge the other electric vehicle, the controller 130 is further configured to receive a handshake request message sent by the other electric vehicle, send a handshake response message to the other electric vehicle, to establish a communication connection between the electric vehicle 100 and the other electric vehicle, and obtain, after establishing the communication connection, the charging request based on the communication connection.

In this embodiment of this application, charging safety and reliability can be improved by establishing the communication connection before charging.

It should be understood that in a communication connection establishment process, alternatively, the electric vehicle 100 may first send a handshake request message to the other electric vehicle, and then receive a handshake response message returned by the other electric vehicle, that is, both the discharged vehicle and the charged vehicle may send the handshake request message.

Optionally, in an embodiment, before the controller 130 controls the battery pack 110 to charge the other electric vehicle, the controller 130 is further configured to receive a charging preparation command of the other electric vehicle, and send a discharging preparation command to the other electric vehicle.

The charging preparation command indicates that the other electric vehicle has already prepared for charging and requests the battery pack 110 to charge the other electric vehicle. The discharging preparation command is a reply to the charging preparation command, and the discharging preparation command is used to instruct the other electric vehicle to prepare to receive the direct current that is output by the battery pack 110. In this way, the direct current that is output by the battery pack 110 may be used to charge the other electric vehicle.

It should be understood that the controller 130 may exchange information with the other electric vehicle in a form of a power line carrier using the charge/discharge cable connecting the electric vehicle 100 and the other electric vehicle, or may exchange information with the other electric vehicle through wireless communication.

Optionally, in an embodiment, when an abnormality occurs in charging, the controller 130 controls the battery pack 110 to stop charging the other electric vehicle. The abnormality in charging may be an excessively large charging current, excessively high charging power, an excessively high charging voltage, or the like.

Optionally, in an embodiment, the charge/discharge cable includes a discharging plug, a charging plug, and a cable connecting the charging plug and the discharging plug. The discharging plug matches the direct current socket 120, and the charging plug matches the alternating current socket of the other electric vehicle.

Optionally, in an embodiment, any one of a pin L1, a pin L2, and a pin L3 of the charging plug is connected to a first pin of the discharging plug using the cable, and a pin N of the charging plug is connected to a second pin of the discharging plug using the cable. The first pin and the second pin are respectively a pin DC+ and a pin DC−, or the first pin and the second pin are respectively a pin DC− and a pin DC+.

For example, the pin L1 of the charging plug is connected to the pin DC− of the discharging plug using the cable, and the pin N of the charging plug is connected to the pin DC+ of the discharging plug using the cable.

Certainly, alternatively, the pin L2 or L3 of the charging plug may be connected to the pin DC− of the discharging plug using the cable, and the pin N of the charging plug is connected to the pin DC+ of the discharging plug using the cable.

It should be understood that that the discharging plug matches the direct current socket 120 may be definitions of an outline dimension and a pin of the discharging plug match those of the direct current socket 120. That the charging plug matches the alternating current socket of the other electric vehicle may be definitions of an outline dimension and a pin of the charging plug match those of the alternating current socket of the other electric vehicle.

It should be understood that in this embodiment of this application, after the direct current socket 120 is connected to the alternating current socket of the other electric vehicle using the charge/discharge cable, the controller may first determine the electric vehicle 100 as the discharged vehicle, then establish the communication connection between the electric vehicle 100 and the other electric vehicle, receive, after establishing the communication connection, the charging request sent by the other electric vehicle, send the discharging configuration parameter to the other electric vehicle, then receive the charging preparation command sent by the other electric vehicle, and return the discharging preparation command to the other electric vehicle such that pre-charging preparation is completed, and then the battery pack 110 can be used to charge the other electric vehicle.

The foregoing describes the electric vehicle in this embodiment of this application from a perspective of the discharged vehicle with reference to FIG. 3. The following describes in detail an electric vehicle in an embodiment of this application from a perspective of a charged vehicle with reference to FIG. 4. It should be understood that the electric vehicle in this embodiment of this application may serve as the charged vehicle or the discharged vehicle. For ease of description, the electric vehicle in this embodiment of this application is separately described herein from the perspective of the discharged vehicle and the perspective of the charged vehicle.

Figure 4:
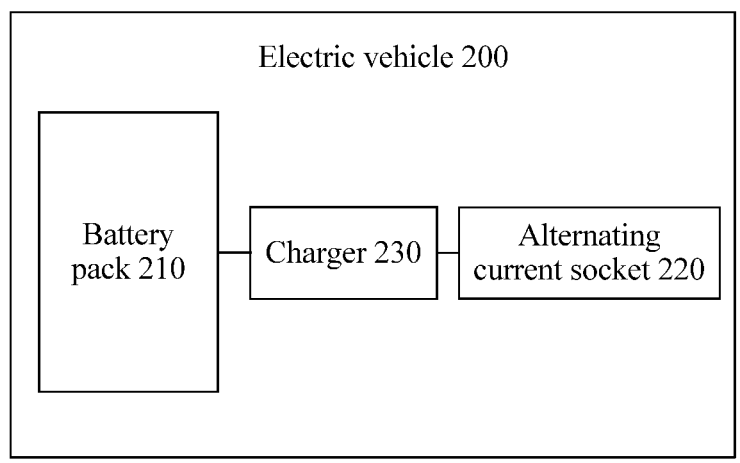
FIG. 4 is a schematic block diagram of an electric vehicle according to an embodiment of this application.

FIG. 4 is a schematic block diagram of an electric vehicle according to an embodiment of this application. The electric vehicle 200 in FIG. 4 includes a battery pack 210, an alternating current socket 220, and a charger 230, where in a process in which the alternating current socket 220 is connected to a direct current socket of another electric vehicle using a charge/discharge cable, the charger 230 receives a direct current that is output by the other electric vehicle to charge the battery pack.

The alternating current socket 220 is a socket that can charge the battery pack 210 using an alternating current charging pile. Further, when the alternating current socket 220 is connected to the alternating current charging pile using a charging cable, the battery pack 210 may be charged using the alternating current charging pile. In addition, the alternating current socket 220 may further receive a direct current or an alternating current that is output by another electric vehicle, to charge the battery pack 210.

It should be understood that the electric vehicle 200 is a charged vehicle in a charging process, namely, a vehicle charged using another electric vehicle. In addition, the charge/discharge cable may be an integral part of the electric vehicle or a separate component independent of the electric vehicle.

In this embodiment of this application, when the alternating current socket of the electric vehicle is connected to the direct current socket of the other electric vehicle using the charge/discharge cable, the direct current that is output by the other electric vehicle may be used to charge the battery pack of the electric vehicle. Compared with a other approaches design solution in which the charger of the electric vehicle needs to be changed, a design solution in which the charger of the electric vehicle is not changed allows using the direct current, output by the other electric vehicle, to charge the battery pack of the electric vehicle such that charging between the electric vehicles can be conveniently implemented.

Optionally, in an embodiment, the electric vehicle 200 further includes a controller (not shown). The controller is configured to obtain a discharging configuration parameter from the other electric vehicle. After the discharging configuration parameter is obtained, the charger 230 is further configured to convert, based on the discharging configuration parameter obtained by the controller, the direct current that is output by the other electric vehicle into a direct current that matches the battery pack, to charge the battery pack 210.

Further, the charger 230 may convert, based on the discharging configuration parameter, a current and a voltage of the direct current that is output by the other electric vehicle into those of the direct current that matches the battery pack.

The discharging configuration parameter may include at least one of electric energy, a discharging voltage, a discharging current, and discharging power that can be supplied by the other electric vehicle when the other electric vehicle charges the battery pack 210.

Further, when the discharging configuration parameter indicates that the other electric vehicle can supply a direct current of 400 volts (V) when charging the battery pack 210, and a voltage value of the direct current that matches the battery pack 210 is 350 V, the charger may then convert the direct current of 400 V that is output by the other electric vehicle into a target direct current of 350 V, and charge the battery pack 210 using the target direct current.

Optionally, in an embodiment, before the charger 230 receives the direct current that is output by the other electric vehicle, to charge the battery pack 210, the controller determines the electric vehicle 200 as a charged vehicle.

That the controller determines the electric vehicle 200 as a charged vehicle further includes that the controller determines a status of a connection between the alternating current socket 220 and the charge/discharge cable, and when the alternating current socket 220 is connected to the charge/ discharge cable, the controller determines the electric vehicle 200 as the charged vehicle.

Optionally, the controller may alternatively first determine that the alternating current socket 220 is connected to a second plug of the charge/discharge cable, and then determine a resistance value of a resistor (for example, the resistor may be a resistor between a pin CC and a pin PE) in the second plug. When the resistance value of the resistor in the second plug is a preset resistance value, the controller determines the electric vehicle 200 as a charged vehicle.

Optionally, in an embodiment, that the controller obtains a discharging configuration parameter of the other electric vehicle includes that the controller sends a charging request to the other electric vehicle, and the controller receives the discharging configuration parameter sent by the other electric vehicle.

Optionally, in an embodiment, before the charger 230 receives the direct current that is output by the other electric vehicle to charge the battery pack 210, the controller further sends a charging preparation command to the other electric vehicle. The charging preparation command indicates that the electric vehicle 200 has already prepared for charging and requests the other electric vehicle to charge the battery pack 210. Then, the controller receives a discharging preparation command of the other electric vehicle, and the discharging preparation command is used to instruct the electric vehicle 200 to prepare to receive the direct current that is output by the other electric vehicle, to charge the electric vehicle 200. After receiving the discharging preparation command, the controller establishes a charging configuration connection between the electric vehicle 200 and the other electric vehicle. After the charging configuration connection is established, the controller starts to control the charger 230 to charge the battery pack 210.

Optionally, in an embodiment, before the charger 230 charges the battery pack 210, the controller is further configured to send a handshake request message to the other electric vehicle, and receive a handshake response message sent by the other electric vehicle, to establish a communication connection between the electric vehicle 200 and the other electric vehicle.

In this embodiment of this application, safety and reliability in a charging process can be improved by establishing the communication connection before charging.

It should be understood that the controller may exchange information with the other electric vehicle in a form of a power line carrier using the charge/discharge cable connecting the electric vehicle 200 and the other electric vehicle, or may exchange information with the other electric vehicle through wireless communication.

Optionally, in an embodiment, the controller is further configured to when an abnormality occurs in charging, control the charger 230 to stop charging the battery pack 210. The abnormality in charging may be an excessively large charging current, excessively high charging power, an excessively high charging voltage, or the like.

Optionally, in an embodiment, the charge/discharge cable includes a discharging plug, a charging plug, and a cable connecting the charging plug and the discharging plug. The charging plug matches the alternating current socket 220, and the discharging plug matches the direct current socket of the other electric vehicle. Further, definitions of an outline dimension and a pin of the charging plug may match those of the alternating current socket 220, and definitions of an outline dimension and a pin of the discharging plug may match those of the direct current socket of the other electric vehicle.

Optionally, in an embodiment, any one of a pin L1, a pin L2, and a pin L3 of the charging plug is connected to a first pin of the discharging plug using the cable, and a pin N of the charging plug is connected to a second pin of the discharging plug using the cable. The first pin and the second pin are respectively a pin DC+ and a pin DC−, or the first pin and the second pin are respectively a pin DC− and a pin DC+.

For example, the pin L1 of the charging plug is connected to the pin DC− of the discharging plug using the cable, and the pin N of the charging plug is connected to the pin DC+ of the discharging plug using the cable.

Certainly, alternatively, the pin L2 or L3 of the charging plug may be connected to the pin DC+ of the discharging plug using the cable, and the pin N of the charging plug is connected to the pin DC− of the discharging plug using the cable.

Alternatively, the pin L2 or L3 of the charging plug is connected to the pin DC− of the discharging plug using the cable, and the pin N of the charging plug is connected to the pin DC+ of the discharging plug using the cable.

It should be understood that in this embodiment of this application, after the alternating current socket 220 is connected to the direct current socket of the other electric vehicle using the charge/discharge cable, the controller may first determine the electric vehicle 200 as the charged vehicle, then establish the communication connection between the electric vehicle 200 and the other electric vehicle, send, after establishing the communication connection, the charging request to the other electric vehicle, obtain the discharging configuration parameter sent by the other electric vehicle, then send the charging preparation command to the other electric vehicle, and receive the discharging preparation command returned by the other electric vehicle such that pre-charging preparation is completed, and then the other electric vehicle can be used to charge the electric vehicle 200.

The foregoing separately describes in detail the electric vehicle in the embodiments of this application from the perspective of the discharged vehicle and the perspective of the charged vehicle with reference to FIG. 2 and FIG. 3. The following describes in detail an electric vehicle in embodiments of this application using specific examples with reference to FIG. 5 to FIG. 7A and FIG. 7B.

Figure 5:
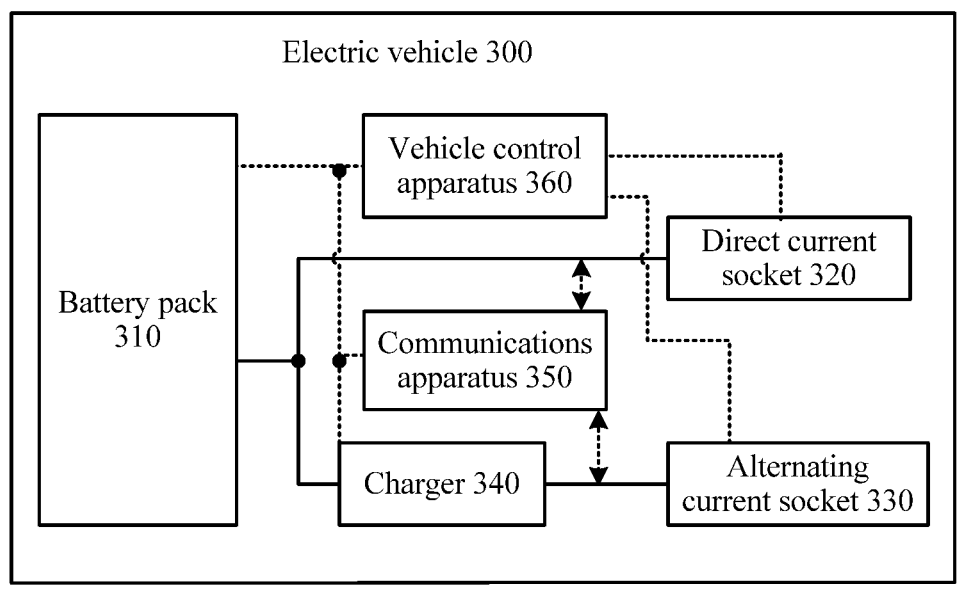
FIG. 5 is a schematic block diagram of an electric vehicle according to an embodiment of this application.

FIG. 5 is a schematic block diagram of an electric vehicle 300 according to an embodiment of this application. The electric vehicle 300 includes a battery pack 310, a direct current socket 320, an alternating current socket 330, a charger 340, a communications apparatus 350, and a vehicle control apparatus 360.

The alternating current socket 330 is connected to the battery pack 310 using the charger 340, to charge the battery pack 310 using an alternating current that is input by the alternating current socket 330 (first the alternating current is converted into a direct current and then the battery pack is charged). The communications apparatus 350 is connected to all the other modules of the electric vehicle 300, and the vehicle control apparatus 360 is also connected to all the other modules of the electric vehicle 300.

When the direct current socket 320 is connected to an alternating current socket of another vehicle using a charge/discharge cable, the vehicle control apparatus 360 controls the charger 340 to charge the other vehicle. When the alternating current socket 330 is connected to a direct current socket of the other vehicle using the charge/discharge cable, the charger 340 receives a direct current that is output by the other vehicle, to charge the battery pack 310. The communications apparatus 350 and the vehicle control apparatus 360 in FIG. 5 are equivalent to the controller 130 of the electric vehicle 100 or the controller of the electric vehicle 200.

Figure 6:
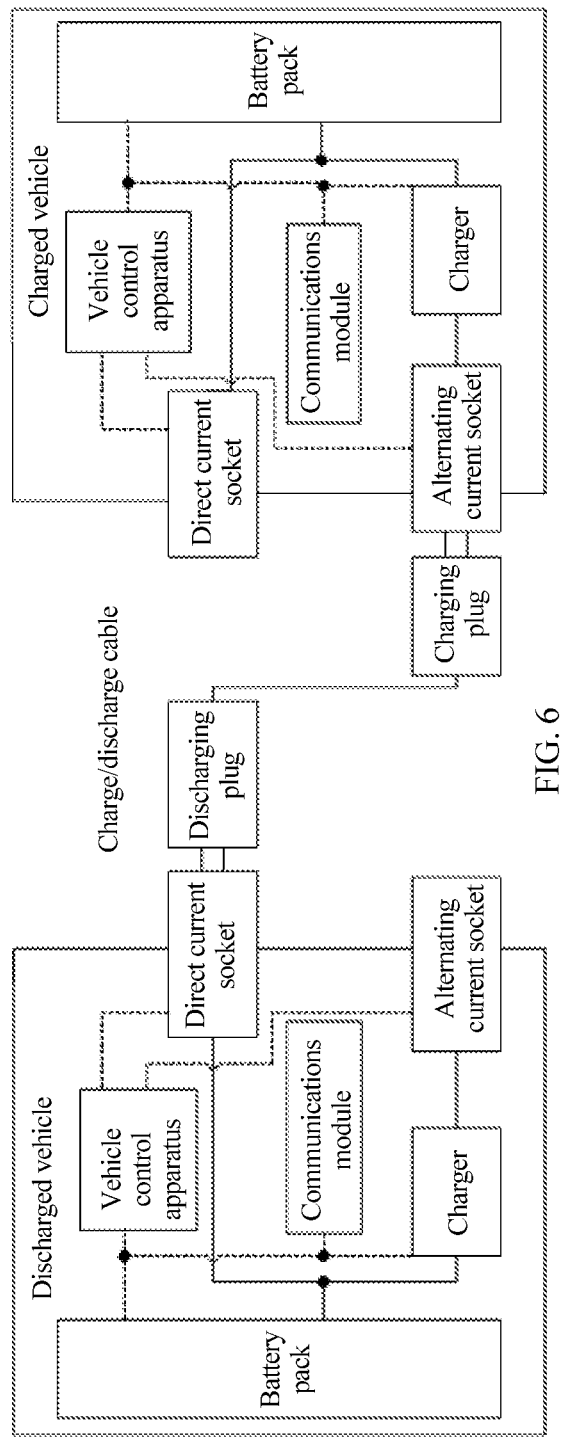
FIG. 6 is a schematic block diagram of a charging system including electric vehicles according to an embodiment of this application.

FIG. 6 is a schematic block diagram of a charging system including electric vehicles according to an embodiment of this application. The charging system includes a discharged vehicle, a charged vehicle, and a charge/discharge cable connecting the discharged vehicle and the charged vehicle. The charge/discharge cable includes a discharging plug and a charging plug. The discharging plug is inserted into a direct current socket of the discharged vehicle, and the charging plug is inserted into an alternating current socket of the charged vehicle. In this way, a battery pack of the discharged vehicle may be used to charge a battery pack of the charged vehicle.

Figure 7A:
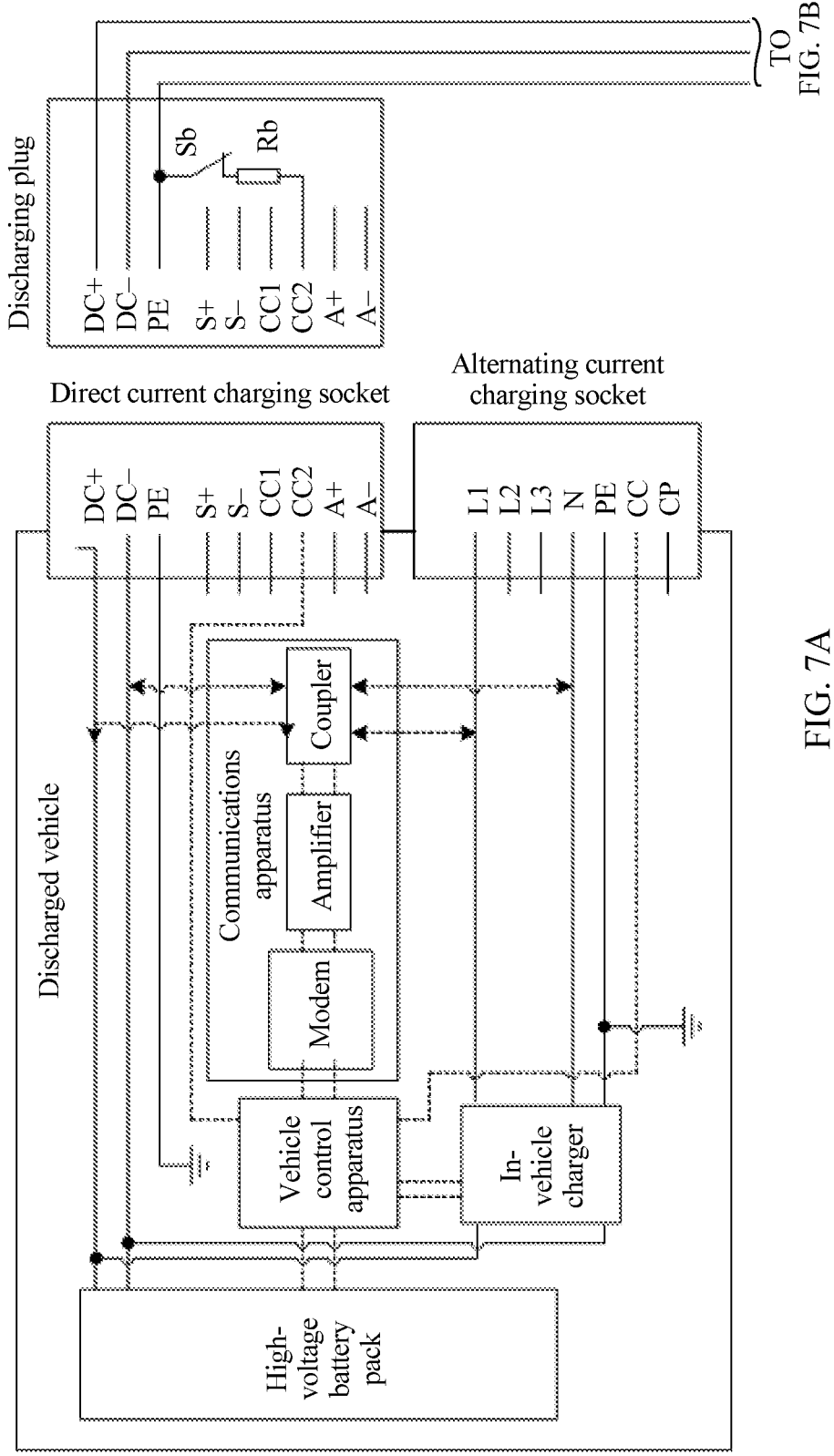
FIG. 7A and FIG. 7B are a schematic block diagram of a charging system including electric vehicles according to an embodiment of this application.
Figure 7B:
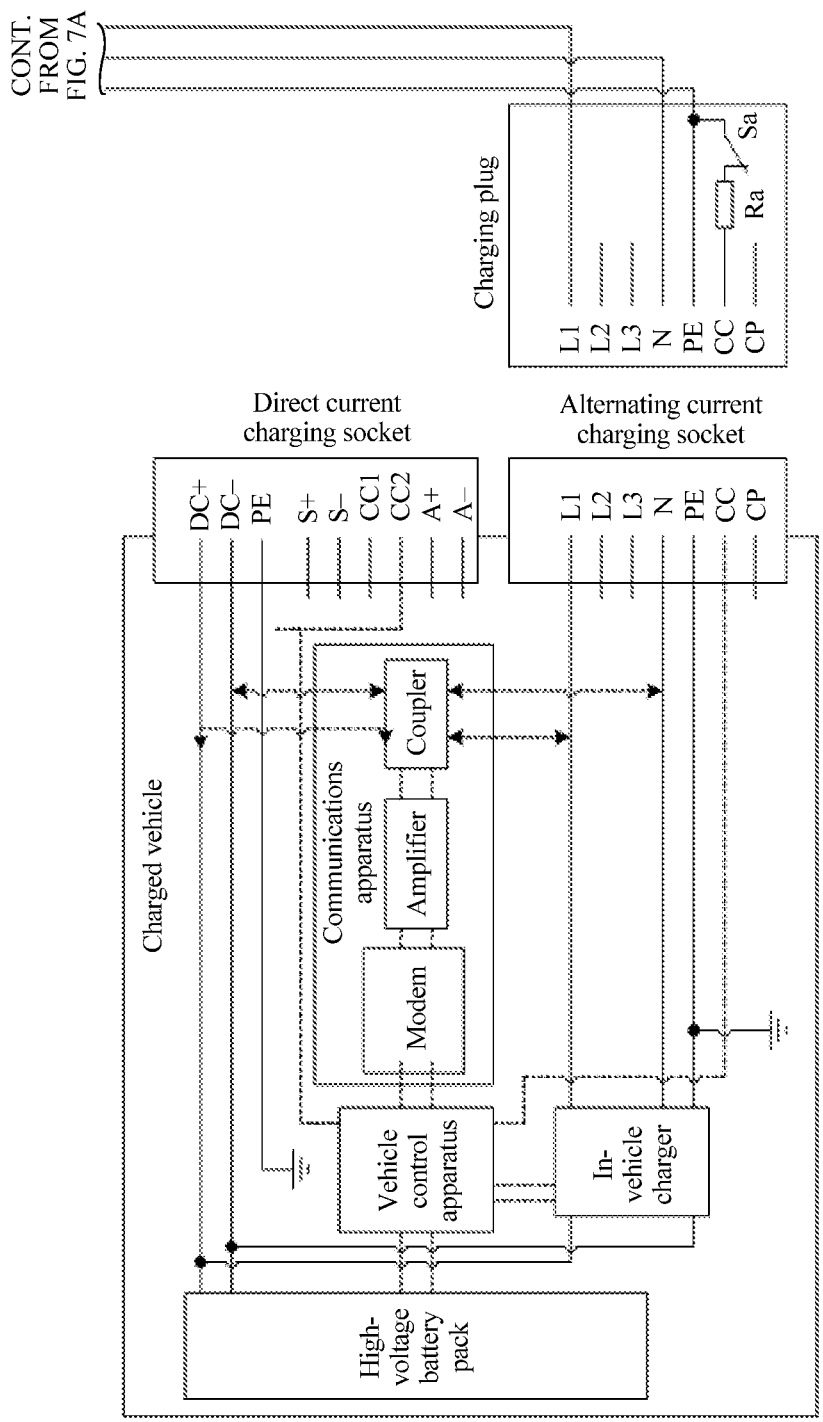

FIG. 7A and FIG. 7B are a schematic block diagram of a charging system including electric vehicles according to an embodiment of this application. In this system, a discharging plug of a charge/discharge cable meets definitions of an outline dimension and a pin of an international direct current charging plug, and a charging plug of the charge/discharge cable meets definitions of an outline dimension and a pin of an international alternating current charging plug.

A manner in which the discharging plug and the charging plug of the charge/discharge cable are connected to each other using a cable is modified in this embodiment of this application. Further, DC+ of the discharging plug is connected to L1 of the charging plug, DC− of the discharging plug is connected to N of the charging plug, PE of the discharging plug is connected to PE of the charging plug, a pin CC2 of the discharging plug is connected to the PE using a resistor Rb and a switch Sb, and a pin CC of the charging plug is connected to the PE using Ra and a switch Sa. A value of the $R_b$ is usually 2 kiloohms (kΩ), and a value of the Ra is usually 2.5 kΩ. The charge/discharge cable in this embodiment of this application includes a plug that matches a direct current socket and a plug that matches an alternating current socket, and the two plugs are connected together in a special connection manner using the cable such that the two plugs can be respectively inserted into the direct current socket and the alternating current socket of the two electric vehicles, thereby implementing charging between the electric vehicles.

A battery pack of a discharged vehicle may be used to charge a battery pack of a charged vehicle when the discharging plug of the charge/discharge cable is inserted into a direct current socket of the discharged vehicle and the charging plug of the charge/discharge cable is connected to an alternating current socket of the charged vehicle. During charging, charging-related modules of the discharged vehicle and the charged vehicle perform the following steps.

S101. If a vehicle control apparatus of the discharged vehicle detects, using the pin CC2, that the Rb is 2 kΩ, the vehicle control apparatus determines that the discharging plug has been inserted into the direct current socket, and this vehicle is the discharged vehicle.

S102. If a vehicle control apparatus of the charged vehicle detects, using the pin CC, that the Ra is 2.5 kΩ, the vehicle control apparatus determines that the charging plug has been inserted into the alternating current socket, and this vehicle is the charged vehicle.

The foregoing steps S101 and S102 may be or maybe not performed simultaneously.

S103. A communications apparatus of the discharged vehicle sends a handshake signal to the charged vehicle.

The communications apparatus may send the handshake signal through wireless communication, or may send the handshake signal using a power line carrier and the direct current socket.

S104. A communications apparatus of the charged vehicle receives the handshake signal sent by the discharged vehicle, and sends a handshake signal or handshake response information to the discharged vehicle.

It should be understood that the discharged vehicle may first send the handshake signal to the charged vehicle, or the charged vehicle may first send the handshake signal to the discharged vehicle. If handshake information or handshake response information returned by a peer device is received within a preset time, it is determined that a communication connection succeeds, or if handshake information or handshake response information returned by a peer device is not received within a preset time, it is determined that a communication connection fails.

S105. The communications apparatus of the charged vehicle sends a charging requirement parameter to the discharged vehicle.

S106. The communications apparatus of the discharged vehicle receives the charging requirement parameter of the charged vehicle, and sends a discharging configuration parameter to the charged vehicle.

S107. The communications apparatus of the charged vehicle sends a charging preparation command to the discharged vehicle.

S108. The communications apparatus of the discharged vehicle receives the charging preparation command of the charged vehicle, and sends a discharging preparation command to the charged vehicle.

Then, the battery pack inside the discharged vehicle may output a current through the direct current socket to charge the charged vehicle.

It should be understood that for ease of description, the electric vehicle in FIG. 2 to FIG. 7A and FIG. 7B includes a module or an apparatus that is related to charging and discharging. Actually, a structure of the electric vehicle in FIG. 2 to FIG. 7A and FIG. 7B may also be shown in FIG. 1.

The foregoing describes in detail the electric vehicle in the embodiments of this application with reference to FIG. 1 to FIG. 7A and FIG. 7B. The following describes, with reference to FIG. 8 and FIG. 9, a method for charging between electric vehicles in the embodiments of this application.

Figure 8:
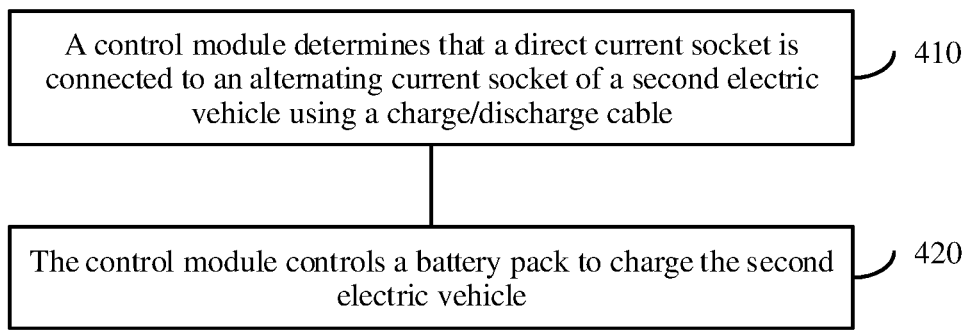
FIG. 8 is a schematic flowchart of a method for charging between electric vehicles according to an embodiment of this application.
Figure 9:
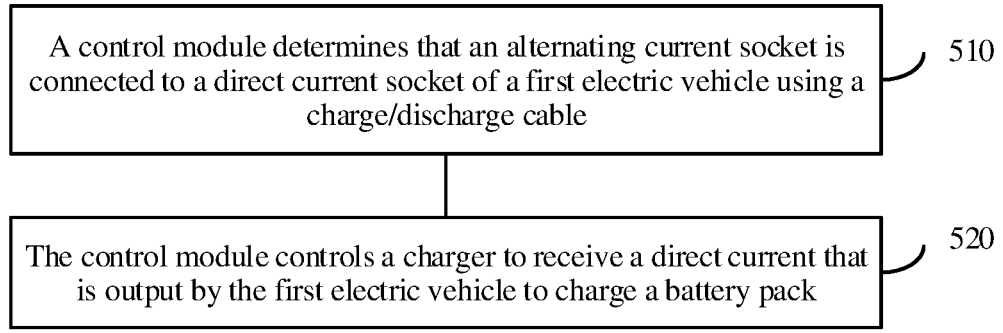
FIG. 9 is a schematic flowchart of a method for charging between electric vehicles according to an embodiment of this application.

It should be understood that the method for charging between electric vehicles in FIG. 8 and FIG. 9 may be performed by the electric vehicles shown in FIG. 1 to FIG. 7A and FIG. 7B. A first electric vehicle and a second electric vehicle described in FIG. 8 and FIG. 9 are respectively equivalent to the electric vehicle 100 and the electric vehicle 200 described above. For brevity, repeated descriptions are appropriately omitted.

FIG. 8 is a schematic diagram of a method for charging between electric vehicles according to an embodiment of this application. The method in FIG. 8 is applied to a discharged first electric vehicle, and the first electric vehicle includes a battery pack, a direct current socket, and a controller. The method in FIG. 8 includes the following steps.

Step 410. The controller determines that the direct current socket is connected to an alternating current socket of a second electric vehicle using a charge/discharge cable.

Step 420. The controller controls the battery pack to charge the second electric vehicle.

The charge/discharge cable may include a discharging plug, a charging plug, and a cable connecting the charging plug and the discharging plug. The discharging plug matches the direct current socket of the first electric vehicle, and the charging plug matches the alternating current socket of the second electric vehicle.

In this embodiment of this application, when the direct current socket of the first electric vehicle is connected to the alternating current socket of the second electric vehicle using the charge/discharge cable, the controller may control the battery pack of the first electric vehicle to charge the second electric vehicle. Compared with the other approaches design solution in which a charger of the electric vehicle needs to be changed, a design solution in which the charger of the electric vehicle is not changed allows using the battery pack of the first electric vehicle to charge the second electric vehicle such that charging between the electric vehicles can be conveniently implemented.

Optionally, in an embodiment, before the controlling, by the controller, the battery pack to charge the second electric vehicle, the method further includes determining the first electric vehicle as a discharged vehicle.

There are two manners for determining the first electric vehicle as the discharged vehicle.

Manner 1:

The controller determines a status of a connection between the direct current socket and the charge/discharge cable, and when the direct current socket is connected to the charge/discharge cable, the controller determines the first electric vehicle as the discharged vehicle.

It should be understood that both the controller and the direct current socket herein are modules or devices of the first electric vehicle.

Manner 2:

The controller determines that the direct current socket is connected to a first plug of the charge/discharge cable, the controller determines a resistance value of a resistor in the first plug, and when the resistance value of the resistor in the first plug is a preset resistance value (for example, may be 2 kΩ), the controller determines the first electric vehicle as the discharged vehicle.

Optionally, in an embodiment, before controlling, by the controller, the battery pack to charge the second electric vehicle, the method further includes receiving, by the controller, a charging request of the second electric vehicle, and sending, by the controller, a discharging configuration parameter to the second electric vehicle.

Further, the second electric vehicle sends the charging request to the controller after the direct current socket of the first electric vehicle is connected to the alternating current socket of the second electric vehicle using the charge/discharge cable. The charging request is used to request the first electric vehicle to charge the second electric vehicle. The charging request may include a charging requirement parameter, and the charging requirement parameter may include at least one of electric energy, a charging voltage, a charging current, and charging power that are required by the second electric vehicle during charging. After obtaining the charging request of the second electric vehicle, the controller needs to return, to the second electric vehicle, the discharging configuration parameter related when the first electric vehicle charges the second electric vehicle. Further, the discharging configuration parameter may include at least one of electric energy, a discharging voltage, a discharging current, and discharging power that can be supplied by the battery pack of the first electric vehicle when the battery pack of the first electric vehicle charges the second electric vehicle.

Optionally, in an embodiment, before controlling, by the controller, the battery pack to charge the second electric vehicle, the method further includes receiving, by the controller, a handshake request message sent by the second electric vehicle, and sending, by the controller, a handshake response message to the second electric vehicle, to establish a communication connection between the first electric vehicle and the second electric vehicle.

In this embodiment of this application, safety and reliability in a charging process can be improved by establishing the communication connection before charging.

It should be understood that in a communication connection establishment process, alternatively, the first electric vehicle may first send a handshake request message to the second electric vehicle, and then receive a handshake response message returned by the second electric vehicle, that is, both the first electric vehicle and the second electric vehicle may send the handshake request message.

Optionally, in an embodiment, before the controlling, by the controller, the battery pack to charge the second electric vehicle, the method further includes receiving, by the controller, a charging preparation command of the second electric vehicle, and sending, by the controller, a discharging preparation command to the second electric vehicle, to establish a charging configuration connection between the first electric vehicle and the second electric vehicle.

The charging preparation command indicates that the second electric vehicle has already prepared for charging and requests the battery pack to charge the second electric vehicle. The discharging preparation command is a reply to the charging preparation command, and the discharging preparation command is used to instruct the second electric vehicle to prepare to receive a direct current that is output by the first electric vehicle. In this way, the direct current that is output by the first electric vehicle may be used to charge the second electric vehicle.

It should be understood that the controller may exchange information with the second electric vehicle in a form of a power line carrier using the charge/discharge cable connecting the first electric vehicle and the second electric vehicle, or may exchange information with the second electric vehicle through wireless communication.

Optionally, in an embodiment, the method further includes when an abnormality occurs in charging, controlling the battery pack to stop charging the second electric vehicle. The abnormality in charging may be an excessively large charging current, excessively high charging power, an excessively high charging voltage, or the like.

It should be understood that in this embodiment of this application, the controller may first determine the first electric vehicle as the discharged vehicle, and then establish the communication connection between the first electric vehicle and the second electric vehicle using the handshake message, then the controller receives the charging request of the second electric vehicle, and returns the discharging configuration parameter to the second electric vehicle, and then the controller receives the charging preparation command sent by the second electric vehicle, and returns the discharging preparation command to the second electric vehicle such that pre-charging preparation is completed, and then the charging pack of the first electric vehicle can be used to charge the second electric vehicle.

FIG. 9 is a schematic diagram of a method for charging between electric vehicles according to an embodiment of this application. The method in FIG. 9 is applied to a charged second electric vehicle, and the second electric vehicle includes a battery pack, an alternating current socket, a charger, and a controller. The method in FIG. 9 includes the following steps.

Step 510. The controller determines that the alternating current socket is connected to a direct current socket of a first electric vehicle using a charge/discharge cable.

Step 520. The charger of the second electric vehicle receives a charging current that is output by the first electric vehicle to charge the battery pack.

The charge/discharge cable may include a discharging plug, a charging plug, and a cable connecting the charging plug and the discharging plug. The charging plug matches the alternating current socket of the second electric vehicle, and the discharging plug matches the direct current socket of the first electric vehicle.

In this embodiment of this application, when the alternating current socket of the second electric vehicle is connected to the direct current socket of the first electric vehicle using the charge/discharge cable, the direct current that is output by the first electric vehicle may be used to charge the battery pack of the second electric vehicle. Compared with a other approaches design solution in which the charger of the electric vehicle needs to be changed, a design solution in which the charger of the electric vehicle is not changed allows using the direct current, output by the first electric vehicle, to charge the battery pack of the second electric vehicle such that charging between the electric vehicles can be conveniently implemented.

Optionally, in an embodiment, the first electric vehicle includes the controller. The method further includes obtaining, by the controller, a discharging configuration parameter of the first electric vehicle, and converting, by the charger based on the discharging configuration parameter, the direct current that is output by the first electric vehicle into a direct current that matches the battery pack, to charge the battery pack.

Further, the charger may convert, based on the discharging configuration parameter, a current and a voltage of the direct current that is output by the first electric vehicle into those of the direct current that matches the battery pack.

Optionally, in an embodiment, obtaining, by the controller, a discharging configuration parameter of the first electric vehicle includes sending, by the controller, a charging request to the other electric vehicle, and receiving, by the controller, the discharging configuration parameter sent by the other electric vehicle.

The discharging configuration parameter may include at least one of electric energy, a discharging voltage, a discharging current, and discharging power that can be supplied by the other electric vehicle when the other electric vehicle charges the battery pack.

Further, when the discharging configuration parameter indicates that the first electric vehicle can supply a direct current of 420 V when charging the battery pack, and a voltage value of the direct current that matches the battery pack is 360 V, the battery pack may then convert the direct current that is output by the first electric vehicle into a target direct current of 360 V, and charge the battery pack using the target direct current.

Optionally, in an embodiment, before the charger charges the battery pack, the method further includes determining, by the controller, the second electric vehicle as a charged vehicle.

There are two manners for determining the second electric vehicle as the charged vehicle.

Manner 3:

The controller determines a status of a connection between the alternating current socket and the charge/discharge cable, and when the alternating current socket is connected to the charge/discharge cable, the controller determines the second electric vehicle as the charged vehicle.

It should be understood that both the controller and the alternating current socket herein are modules or devices of the second electric vehicle.

Manner 4:

The controller determines that the alternating current socket is connected to a second plug of the charge/discharge cable, the controller determines a resistance value of a resistor in the second plug, and when the resistance value of the resistor in the second plug is a preset resistance value (for example, may be 2.5 kΩ), the controller determines the second electric vehicle as the charged vehicle.

Optionally, in an embodiment, before the charger charges the battery pack, the method further includes sending, by the controller, a charging preparation command to the first electric vehicle, and receiving, by the controller, a discharging preparation command returned by the first electric vehicle.

The charging preparation command indicates that the second electric vehicle has already prepared for charging and requests the first electric vehicle to charge the second electric vehicle. The discharging preparation command is a reply to the charging preparation command, and the discharging preparation command is used to instruct the second electric vehicle to prepare to receive the direct current that is output by the first electric vehicle. In this way, the direct current that is output by the first electric vehicle may be used to charge the second electric vehicle.

Optionally, in an embodiment, before the charger charges the battery pack, the method further includes sending, by the controller, a handshake request message to the first electric vehicle, and receiving, by the controller, a handshake response message of the first electric vehicle, to establish a communication connection between the first electric vehicle and the second electric vehicle.

In this embodiment of this application, safety and reliability in a charging process can be improved by establishing the communication connection before charging.

It should be understood that the controller may exchange information with the first electric vehicle in a form of a power line carrier using the charge/discharge cable connecting the second electric vehicle and the first electric vehicle, or may exchange information with the first electric vehicle through wireless communication.

Optionally, in an embodiment, the method further includes when an abnormality occurs in charging, controlling the charger to stop charging the battery pack.

It should be understood that the first electric vehicle is equivalent to the electric vehicle 100 in the foregoing embodiment, and the second electric vehicle is equivalent to the electric vehicle 200 in the foregoing embodiment. The electric vehicle 100 can perform the method for charging between electric vehicles shown in FIG. 4, and the electric vehicle 200 can perform the method for charging between electric vehicles shown in FIG. 5.

It should be further understood that in this embodiment of this application, after the alternating current socket of the second electric vehicle is connected to the direct current socket of the first electric vehicle using the charge/discharge cable, the controller may first determine the second electric vehicle as the charged vehicle, and then establish the communication connection between the second electric vehicle and the first electric vehicle, send, after establishing the communication connection, the charging request to the first electric vehicle, obtain the discharging configuration parameter sent by the first electric vehicle, then send the charging preparation command to the first electric vehicle, and receive the discharging preparation command returned by the first electric vehicle such that pre-charging preparation is completed, and then the first electric vehicle can be used to charge the electric vehicle 200.

Figure 10:
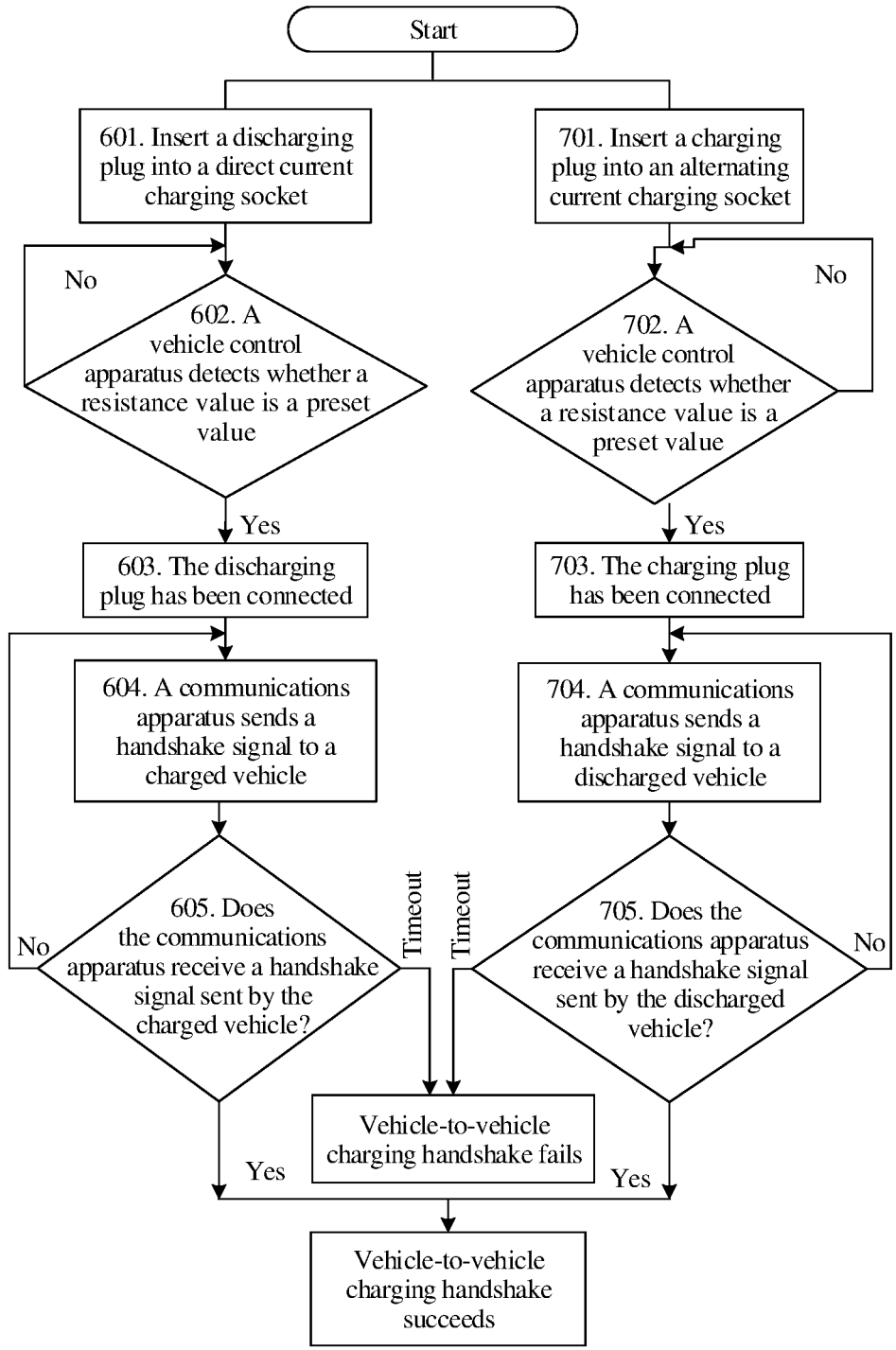
FIG. 10 is a schematic flowchart of a method for charging between electric vehicles according to an embodiment of this application.
Figure 11:
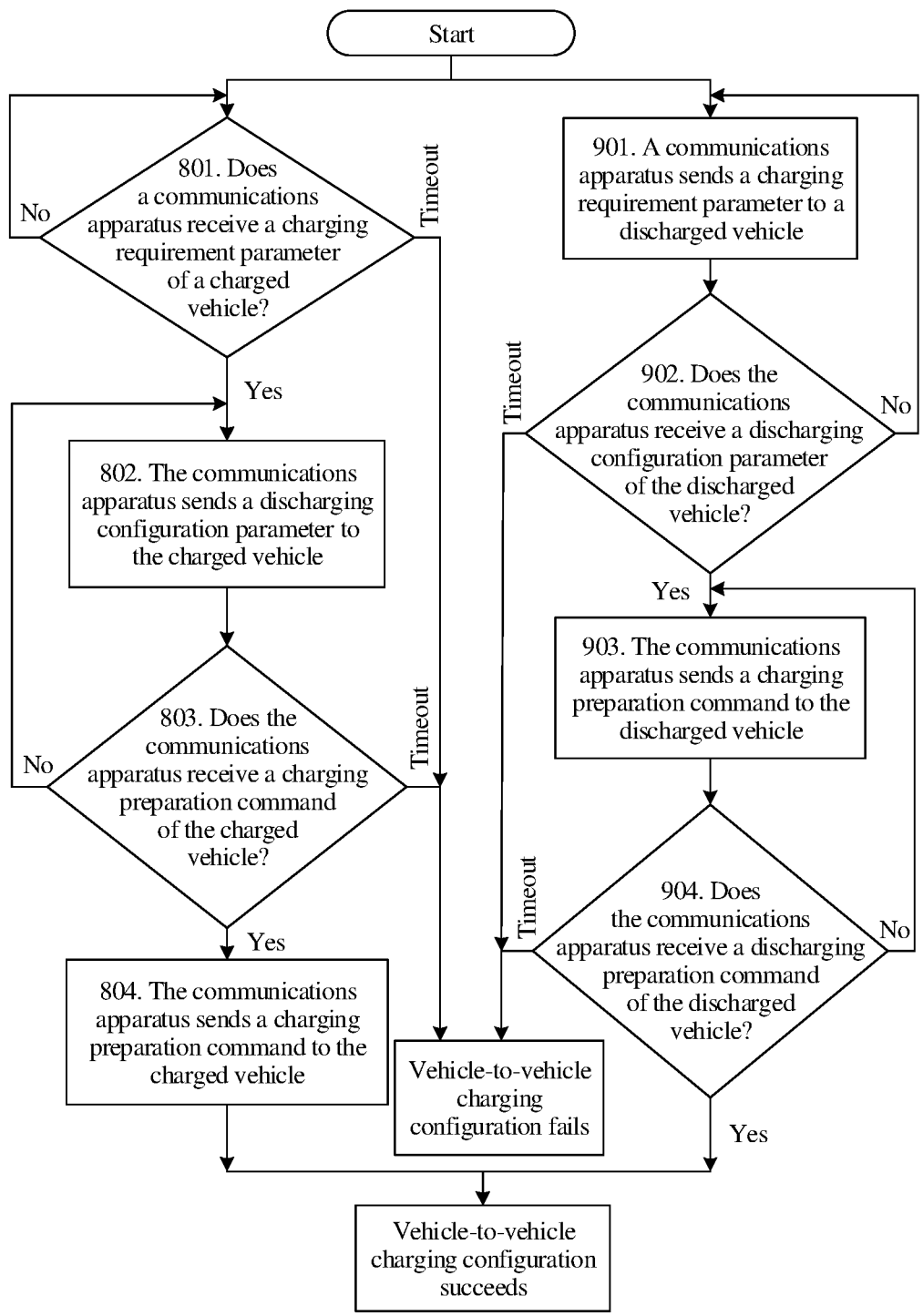
FIG. 11 is a schematic flowchart of a method for charging between electric vehicles according to an embodiment of this application.

The following describes, in detail with reference to FIG. 10 and FIG. 11, a communication connection establishment process and a charging configuration process in the method for charging between electric vehicles in this embodiment of this application.

As shown in FIG. 10, in the communication connection establishment process, steps 601 to 605 are performed on a discharged vehicle side, and steps 701 to 705 are performed on a charged vehicle side. Specific steps are as follows.

Step 601. Insert a discharging plug of a charge/discharge cable into a direct current socket of a discharged vehicle.

Step 602. A vehicle control apparatus detects, using a pin CC2, whether a resistance value of a resistor in the discharging plug is a preset value, and performs step 603 if the resistance value of the resistor is the preset value, or continues to perform step 602 if it is detected, using the pin CC2, that the resistance value of the resistor in the discharging plug is not the preset value. The preset value herein may be 2 k$\Omega$.

Step 603. When the resistance value of the resistor in the discharging plug is the preset value, determine that the discharging plug has been connected to the direct current socket.

Step 604. A communications apparatus sends a handshake signal to a charged vehicle. The communications apparatus may further send the handshake signal to the charged vehicle in a form of a power line carrier using the direct current socket and the charge/discharge cable, or may send the handshake signal to the charged vehicle through wireless communication.

Step 605. The communications apparatus determines whether a handshake signal sent by the charged vehicle is received. If the handshake signal of the charged vehicle is received, the communications apparatus determines that vehicle-to-vehicle charging handshake succeeds, or if the handshake signal sent by the charged vehicle is still not received within a preset time, the communications apparatus determines that vehicle-to-vehicle charging handshake fails.

Step 701. Insert a charging plug of a charge/discharge cable into an alternating current socket of a charged vehicle.

Step 702. A vehicle control apparatus detects, using a pin CC, whether a resistance value of a resistor in the charging plug is a preset value, and performs step 703 if the resistance value of the resistor is the preset value, or continues to perform step 702 if it is detected, using the pin CC, that the resistance value of the resistor in the charging plug is not the preset value. The preset value herein may be 2.5 k$\Omega$.

Step 703. When the resistance value of the resistor in the charging plug is the preset value, determine that the charging plug has been connected to the alternating current socket.

Step 704. A communications apparatus sends a handshake signal to a discharged vehicle. The communications apparatus may further send the handshake signal to a charged vehicle in a form of a power line carrier using a direct current socket and the charge/discharge cable, or may send the handshake signal to a charged vehicle through wireless communication.

Step 705. The communications apparatus determines whether a handshake signal sent by the discharged vehicle is received. If the handshake signal of the discharged vehicle is received, the communications apparatus determines that vehicle-to-vehicle charging handshake succeeds, or if the handshake signal sent by the discharged vehicle is still not received within a preset time, the communications apparatus determines that vehicle-to-vehicle charging handshake fails.

In the communication connection establishment process, steps 601 to 605 performed on the discharged vehicle side are basically the same as steps 701 to 705 performed on the charged vehicle side. A difference lies only in that the resistance value of the resistor in the discharging plug is detected on the discharged device side, and the resistance value of the resistor in the charging plug is detected on the charged device side. In addition, a sequence in which the discharged vehicle and the charged vehicle send the handshake signal is not limited in the communication connection establishment process. That is, the discharged vehicle may first send the handshake signal or the charged vehicle may first send the handshake signal.

As shown in FIG. 11, in the charging configuration process, steps 801 to 804 are performed on a discharged vehicle side, and steps 901 to 904 are performed on a charged vehicle side. Specific steps are as follows.

Step 801. A communications apparatus determines whether a charging requirement parameter of a charged vehicle is received, and continues to perform step 801 if the charging requirement parameter is not received, or performs step 802 if the charging requirement parameter is received.

Step 802. After receiving the charging requirement parameter, the communications apparatus sends a discharging configuration parameter to the charged vehicle.

Step 803. The communications apparatus determines whether a charging preparation command of the charged vehicle is received, and continues to perform step 803 if the charging preparation command is not received, or performs step 804 if the charging preparation command is received.

Step 804. The communications apparatus sends a charging preparation command to the charged vehicle to instruct a discharged vehicle to charge the charged vehicle.

Step 901. A communications apparatus sends a charging requirement parameter to a discharged vehicle.

Step 902. The communications apparatus determines whether a discharging configuration parameter of the discharged vehicle is received, and continues to perform step 702 if the discharging configuration parameter is not received, or performs step 703 if the discharging configuration parameter is received.

Step 903. The communications apparatus sends a charging preparation command to the discharged vehicle to request the discharged vehicle to charge a charged vehicle.

Step 904. The communications apparatus determines whether a discharging preparation command of the discharged vehicle is received, and continues to perform step 904 if the discharging preparation command is not received, or if the discharging preparation command is received, the communications apparatus determines that vehicle-to-vehicle charging configuration succeeds.

If in steps 803 and 904, the communications apparatus of the discharged vehicle still does not receive the charging preparation command of the charged vehicle within a preset time, and/or the communications apparatus of the charged vehicle still does not receive the charging preparation command of the discharged vehicle within a preset time, the communications apparatus determines that the vehicle-to-vehicle charging configuration fails.

In the foregoing steps, the charging requirement parameter may include at least one of electric energy, a charging voltage, a charging current, and charging power that are required by the charged vehicle during charging. The discharging configuration parameter includes at least one of electric energy, a discharging voltage, a discharging current, and discharging power that can be supplied by the discharged vehicle when the discharged vehicle charges the charged vehicle.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A first electric vehicle, comprising:
   a battery pack;
   an alternating current socket configured to receive a direct current from a second electric vehicle in response to the alternating current socket coupling to a direct current socket of the second electric vehicle using a charge/discharge cable;
   a charger coupled to the battery pack and the alternating current socket; and a controller coupled to the battery pack and the alternating current socket and configured to control the charger to charge the battery pack with the direct current from the second electric vehicle.

2. The first electric vehicle of claim 1, wherein the controller is further configured to obtain a discharging configuration parameter from the second electric vehicle, and wherein the charger is further configured to convert, based on the discharging configuration parameter, the direct current received from the second electric vehicle into a direct current matching the battery pack to charge the battery pack.

3. The first electric vehicle of claim 2, wherein the controller is further configured to:
send a charging request to the second electric vehicle; and
receive the discharging configuration parameter from the second electric vehicle after the second electric vehicle receives the charging request, wherein the discharging configuration parameter comprises at least one of electric energy, a discharging voltage, a discharging current, or discharging power supplied by the second electric vehicle when the second electric vehicle is charging the battery pack.

4. The first electric vehicle of claim 2, wherein before charging the battery pack, the controller is further configured to:
send a handshake request message to the second electric vehicle; and
receive a handshake response message from the second electric vehicle to establish a communication coupling between the first electric vehicle and the second electric vehicle.

5. The first electric vehicle of claim 1, wherein the charge/discharge cable that uses by the alternating current socket to couple to the direct current socket of the second electric vehicle comprises a discharging plug, a charging plug, and a cable coupling the charging plug and the discharging plug, wherein the charging plug matches the alternating current socket, and wherein the discharging plug matches the direct current socket of the second electric vehicle.

6. The first electric vehicle of claim 5, wherein the charging plug comprises an L1 pin, an L2 pin, an L3 pin, and an N pin, wherein the discharging plug comprises a first pin and a second pin, wherein one of the L1 pin, the L2 pin, or the L3 pin is coupled to the first pin using the cable, wherein the N pin is coupled to the second pin using the cable, wherein the first pin comprises a DC+ pin, and wherein the second pin comprises a DC− pin.

7. The first electric vehicle of claim 1, further comprising the charge/discharge cable.

8. A method for charging between electric vehicles, wherein the method is applied to a first electric vehicle comprising a battery pack, an alternating current socket, a charger, and a controller, and wherein the method comprises:
determining, by the controller, that the alternating current socket is coupled to a direct current socket of a second electric vehicle using a charge/discharge cable; and
controlling, by the controller, the charger to receive a direct current from the second electric vehicle to charge the battery pack.

9. The method of claim 8, further comprising:
obtaining, by the controller, a discharging configuration parameter of the second electric vehicle; and
converting, by the charger based on the discharging configuration parameter, the direct current received from the second electric vehicle into a direct current matching the battery pack to charge the battery pack.

10. The method of claim 9, wherein obtaining the discharging configuration parameter comprises:
sending, by the controller, a charging request to the second electric vehicle; and
receiving, by the controller, the discharging configuration parameter from the second electric vehicle after the second electric vehicle receives the charging request, wherein the discharging configuration parameter comprises at least one of electric energy or a discharging voltage supplied by the second electric vehicle when the second electric vehicle charges the battery pack.

11. The method of claim 8, wherein before charging the battery pack, the method further comprises:
sending, by the controller, a handshake request message to the second electric vehicle; and
receiving, by the controller, a handshake response message from the second electric vehicle to establish a communication coupling between the first electric vehicle and the second electric vehicle.

12. The method of claim 9, wherein obtaining the discharging configuration parameter comprises:
sending, by the controller, a charging request to the second electric vehicle; and
receiving, by the controller, the discharging configuration parameter from the second electric vehicle after the second electric vehicle receives the charging request, wherein the discharging configuration parameter comprises a discharging current supplied by the second electric vehicle when the second electric vehicle charges the battery pack.

13. The method of claim 9, wherein obtaining the discharging configuration parameter comprises:
sending, by the controller, a charging request to the second electric vehicle; and
receiving, by the controller, the discharging configuration parameter from the second electric vehicle after the second electric vehicle receives the charging request, wherein the discharging configuration parameter comprises discharging power supplied by the second electric vehicle when the second electric vehicle charges the battery pack.

14. A charge system, comprising:
a charge/discharge cable; and
a first electric vehicle comprising:
a battery pack;
an alternating current socket configured to receive a direct current from a second electric vehicle in response that the alternating current socket coupling to a direct current socket of the second electric vehicle using the charge/discharge cable;
a charger coupled to the battery pack and the alternating current socket; and
a controller coupled to the battery pack and the alternating current socket and configured to control the charger to charge the battery pack with the direct current from the second electric vehicle.

15. The charge system of claim 14, wherein the controller is further configured to receive a discharging configuration parameter from the second electric vehicle, and wherein the charger is further configured to convert, based on the discharging configuration parameter, the direct current received from the second electric vehicle into a direct current matching the battery pack to charge the battery pack.

16. The charge system of claim 15, wherein the controller is further configured to:

send a charging request to the second electric vehicle; and receive the discharging configuration parameter from the second electric vehicle after the second electric vehicle receives the charging request, wherein the discharging configuration parameter comprises at least one of electric energy, a discharging voltage, a discharging current, or discharging power supplied by the second electric vehicle when the second electric vehicle is charging the battery pack.

17. The charge system of claim 15, wherein before charging the battery pack, the controller is further configured to:

send a handshake request message to the second electric vehicle; and receive a handshake response message from the second electric vehicle to establish a communication coupling between the first electric vehicle and the second electric vehicle.

18. The charge system of claim 14, wherein the charge/discharge cable comprises:

a discharging plug configured to match the direct current socket of the second electric vehicle;

a charging plug configured to match the alternating current socket of the first electric vehicle; and a cable coupling the charging plug and the discharging plug.

19. The charge system of claim 18, wherein the charging plug comprises an L1 pin, an L2 pin, an L3 pin, and an N pin, wherein the discharging plug comprises a first pin and a second pin, wherein one of the L1 pin, the L2 pin, or the L3 pin is coupled to the first pin using the cable, wherein the N pin is coupled to the second pin using the cable, wherein the first pin comprises a DC+ pin, and wherein the second pin comprises a DC− pin.

20. The charge system of claim 18, wherein the charging plug comprises an L1 pin, an L2 pin, an L3 pin, and an N pin, wherein the discharging plug comprises a first pin and a second pin, wherein one of the L1 pin, the L2 pin, or the L3 pin is coupled to the first pin using the cable, wherein the N pin is coupled to the second pin using the cable, wherein the first pin comprises a DC− pin, and wherein the second pin comprises a DC+ pin.

* * * * *